United States Patent (12) United States Patent
Viswanathan et al.

(10) Patent No.: US 8,755,404 B2
(45) Date of Patent: Jun. 17, 2014

(54) FACILITATING COMMUNICATION BETWEEN RESOURCE-CONSTRAINED DEVICES AND WIRELESS COMMUNICATION TERMINALS

(75) Inventors: Prashant Viswanathan, Bangalore (IN); Pankaj Vyas, Bangalore (IN); Greg Winner, Orange, CA (US); Vishal Batra, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 77 days.

(21) Appl. No.: 13/455,159

(22) Filed: Apr. 25, 2012

(65) Prior Publication Data

US 2013/0286951 A1 Oct. 31, 2013

(51) Int. Cl.
*H04J 3/16* (2006.01)

(52) U.S. Cl.
USPC ............ 370/466; 370/329; 370/252; 370/467

(58) Field of Classification Search
CPC ........ H04L 45/04; H04L 45/10; H04L 45/02; H04L 12/66; H04L 29/06163; H04L 29/08009; H04L 29/06068; H04L 29/06095; H04L 1/0001; H04L 47/10; H04L 47/11; H04L 47/15; H04L 47/30; H04L 47/35; H04L 43/50; H04L 41/12; H04W 24/00; H04W 72/04; H04W 88/08
USPC ......... 370/229, 230, 252, 254, 329, 400, 401, 370/465, 466, 467, 468, 469
See application file for complete search history.

(56) References Cited

U.S. PATENT DOCUMENTS

| | | | |
|---|---|---|---|
| 7,024,473 B2 | 4/2006 | Parent | |
| 8,245,188 B2* | 8/2012 | Hertenstein | 717/114 |
| 2002/0077077 A1* | 6/2002 | Rezvani et al. | 455/410 |
| 2003/0051019 A1 | 3/2003 | Oswald | |
| 2003/0229723 A1 | 12/2003 | Kangas et al. | |
| 2005/0251417 A1* | 11/2005 | Malhotra et al. | 705/2 |
| 2009/0003275 A1* | 1/2009 | Shenfield et al. | 370/329 |
| 2010/0042692 A1* | 2/2010 | Irwin et al. | 709/206 |
| 2010/0049874 A1* | 2/2010 | Chene et al. | 709/246 |
| 2010/0233961 A1 | 9/2010 | Holden et al. | |
| 2011/0159916 A1* | 6/2011 | Boskovic | 455/556.1 |
| 2011/0270895 A1* | 11/2011 | Shelby | 707/803 |
| 2012/0151028 A1* | 6/2012 | Lu et al. | 709/223 |
| 2013/0201839 A1* | 8/2013 | Ree et al. | 370/252 |

OTHER PUBLICATIONS

"Liviu Iftode, Cristian Borcea, Nishkam Ravi, Porlin Kang, and Peng Zhou", "Smart Phone: An Embedded System for Universal Interactions", Downloaded Feb. 10, 2012, p. 1-12.

(Continued)

*Primary Examiner* — Abdullah Riyami
(74) *Attorney, Agent, or Firm* — Narendra Reddy Thappeta (57) ABSTRACT

A link device facilitating communication between a wireless communication terminal and a resource-constrained device. According to an aspect, the link device receives messages from the wireless communication terminal on a wireless path according to a first protocol, converts the messages into a second protocol, and forwards the converted messages in the second protocols to the resource-constrained device on a wired path connecting the link device to the resource-constrained device. In an embodiment, the first protocol corresponds to HTTP protocol and the second protocol corresponds to a simpler protocol which requires relatively lesser processing and memory resources.

27 Claims, 7 Drawing Sheets

(56) References Cited

OTHER PUBLICATIONS

"M. Can Filibeli, Oznur Ozkasap and M. Reha Civanlar", "Embedded web server-based home appliance networks", Journal of Network and Computer Applications 30 (Year 2007), pp. 499-514.

"Malik Sikandar Hayat Khiyal, Aihab Khan, and Erum Shehzadi", "SMS Based Wireless Home Appliance Control System (HACS) for Automating Appliances and Security", vol. 6, Dated Year 2009, Issues in Informing Science and Information Technology pp. 1-8.

"Interacting with personal robots and smart environments", http://spiedigitallibrary.org/proceedings/resource/2/psisdg/3837/1/26_1?isAuthorized=no, Proc. SPIE 3837, 26 (1999); doi:10.1117/12.360313, Dated: Sep. 20, 1999, p. 1-2.

* cited by examiner

FACILITATING COMMUNICATION BETWEEN RESOURCE-CONSTRAINED DEVICES AND WIRELESS COMMUNICATION TERMINALS

BACKGROUND

1. Technical Field

Embodiments of the present disclosure relate generally to wireless devices, and more specifically to facilitating communication between resource-constrained devices and wireless communication terminals.

2. Related Art

Resource-constrained devices are a class of embedded devices. As is well known in the relevant arts, embedded devices may operate with minimal processing and/or memory capabilities to the point they generally have minimal user interfaces (e.g., LEDs and switches, but not support for much bigger displays such as monitors or graphical user interfaces). Resource constrained devices are characterized as a subset of such embedded devices, while have small memory and limited processing power such that complex software applications cannot be implemented within such devices. Resource-constrained devices find use in machines such as refrigerators, automobiles, lighting systems, printers, control networks, sensor networks, etc.

Wireless communication terminals refer to devices such as mobiles phones, lap-top computers, and personal digital assistants (PDA), which support wireless communication according to protocols such as Wifi™/802.11, Blue Tooth™ or cellular protocols. Wireless communication terminals are provided with sufficient processing and/or memory capabilities to support applications which can use wireless protocols and standard internet protocols to communicate with other devices on a network (e.g., the world-wide web using protocols such as HTTP). Wireless communication terminals are also able to communicate using standard data interchange formats such as XML and JSON (JavaScript Object Notation).

There is often a need to facilitate communication between resource-constrained devices and wireless communication terminals. In one prior approach, additional capabilities are sought to be integrated into resource-constrained devices such that each resource-constrained device can communicate directly over a wireless medium with a wireless communication terminal. Unfortunately, not all resource-constrained devices may need such a capability to communicate wirelessly and the corresponding overhead may be unacceptable for manufacturers of some resource-constrained devices.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

A link device facilitating communication between a wireless communication terminal and a resource-constrained device according to several aspects of the present invention. According to an aspect, the link device receives messages from the wireless communication terminal on a wireless path according to a first protocol, converts the messages into a second protocol, and forwards the converted messages in the second protocols to the resource-constrained device using a wired path connecting the link device to the resource-constrained device.

In an embodiment, the first protocol corresponds to HTTP protocol (with payload portion encoded in XML format) and the second protocol corresponds to a simpler protocol which requires less processing and memory resources (compared to those required with respect to HTTP/XML combination). The second protocol may provide for more deterministic parsing, for example, as lengths of message fragments are available and fields clearly separated using a separator. The resource-constrained device can accordingly be implemented with correspondingly reduced memory and processing resources.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Devices

Figure 1:
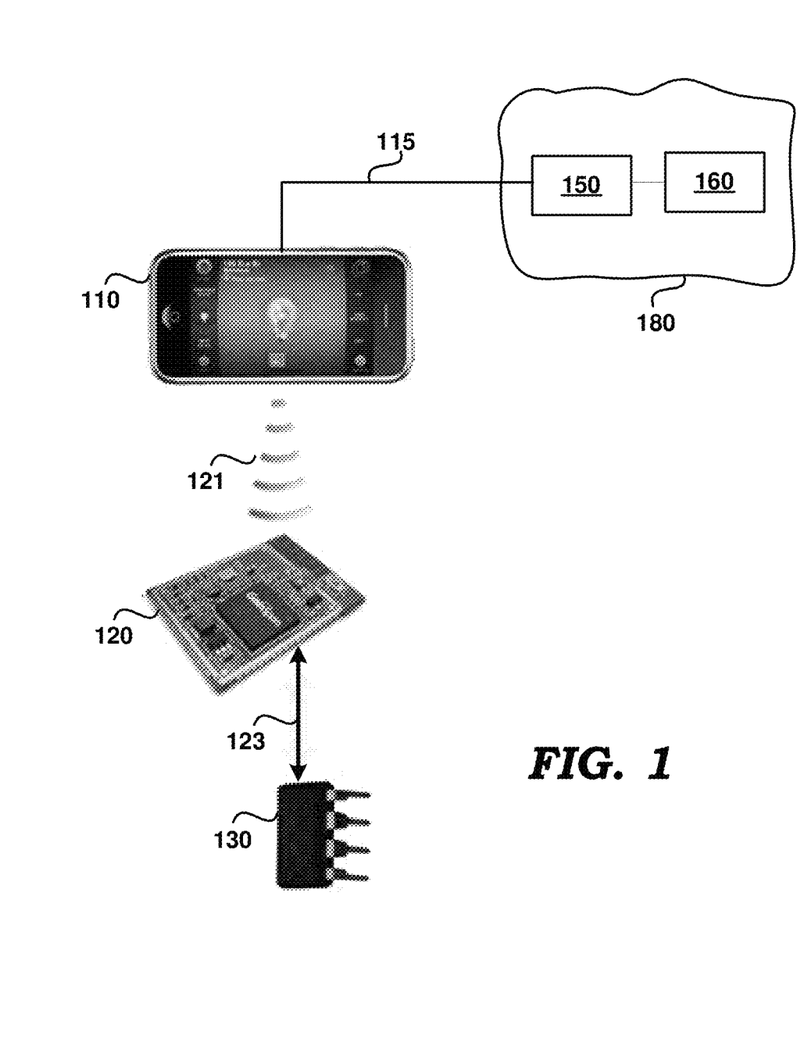
FIG. 1 is a block diagram illustrating an example environment in which several features of the present invention are operative.

FIG. 1 shows wireless communication terminal 110, link unit 120, and resource-constrained device 130 in an embodiment of the present invention. Resource-constrained device 130 may represent a microcontroller or a microprocessor with some memory and specialized circuitry (e.g., a sensor) for providing desired features. Examples of resource-constrained device 130 include temperature sensors, pressure sensors, blood pressure monitors, blood glucose monitors, actuators, etc., but in general can be any device with corresponding circuitry that performs a desired operation.

Resource-constrained device 130 could also be a device such as a refrigerator or a printer, each with embedded intelligence (e.g., in the form of a microcontroller and a small amount of memory) that enables communication with the external world. Thus, constraint in terms of resources as used herein, refers to minimal processing and/or memory capabilities for processing of information/data and communication with external devices. In particular, resource-constrained device 130 may be incapable of forming and/or parsing (implying either or both) messages in XML format. Resource-constrained device 130 may be incapable of transmitting/receiving such messages using HTTP protocol.

Wireless communication terminal 110 may represent a mobile phone, PDA (personal digital assistant), etc., and supports wireless communication protocols such as Wifi™, Blue Tooth™ or cellular protocols (GSM, CDMA, etc). In another embodiment, wireless communication terminal 110 is connected by wired path(115) to a cloud computing system (cloud) 180. In FIG. 1, cloud 180 is shown containing only two representative nodes 150 and 160 for illustration. However, cloud 180 typically contains many more nodes, which may operate in conjunction with each other to provide desired features. In the embodiment, wireless communication terminal 110 represents a last-hop terminal of cloud 180, and provides the last-hop (over a wireless medium) in a communication path between a corresponding computing component (e.g., node 160) in cloud 180 and link device 120.

Wireless communication terminal 110 may contain applications designed to communicate with other devices/applications using standard internet protocols (TCP, UDP, IP, HTTP) and data formats such as XML. In other embodiments, such applications as noted above may instead reside in one or more nodes within cloud 180, and designed to be capable of communication via wireless communication terminal 110 with other devices/systems. Thus, applications are implemented external to wireless communication terminal 110, in cloud 180.

It may be appreciated that it may not be possible for applications in wireless communication terminal 110 to communicate with resource-constrained device 130 using protocols such as HTTP and data formats such as XML, since supporting such communication protocols may require high processing capabilities and/or large memories for accommodating larger program size in resource-constrained device 130. Another reason why such communication may not be possible between wireless communication terminal 110 and resource-constrained device 130 is that resource-constrained device 130 may not be implemented to have wireless communication capability.

Link device 120, provided according to an aspect of the present invention, facilitates communication between wireless communication terminal 110 and resource-constrained device 130. Link device 120 is implemented with corresponding communications interface(s) to enable wireless communication with wireless communication terminal 110. Thus, link device 120 may contain a transceiver (transmitter plus receiver) and corresponding antennas to enable such wireless communication (e.g., according GSM, CDMA, Bluetooth™, WiFi™/802.11etc). In addition, link device 120 is implemented with hardware and/or software to enable communication with applications executing in wireless communication terminal 110 using standard internet protocols (TCP, UDP, IP, HTTP) and data formats such as XML.

Link device 120 is connected to resource-constrained device 130 via a wired path (i.e., electrical conductor in the entire path), and may contain corresponding circuitry to enable wired communication with resource-constrained device 130. For example, link device 120 may be implemented with an RS-232 serial interface (UART) to enable communication with resource-constrained device 130. Resource-constrained device 130 may similarly contain an RS-232 serial interface (UART). Another common interface may be SPI (serial peripheral interface).

Link device 120 enables communication between wireless communication terminal 110 and resource-constrained device 130 in a manner as described next.

3. Facilitating Communication

Figure 2:
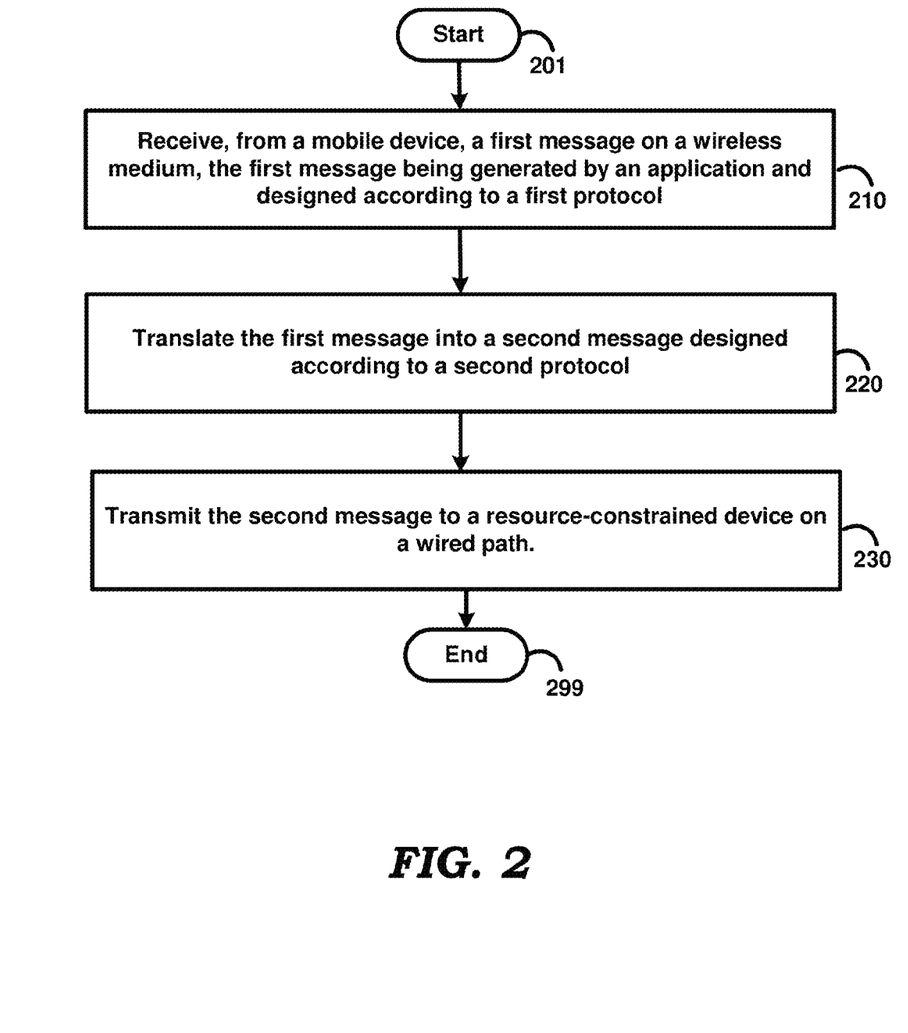
FIG. 2 is a flowchart illustrating the manner in which a link device facilitates communication between a wireless communication terminal and a resource-constrained device, in an embodiment.

FIG. 2 is a flowchart illustrating the manner in which a link device facilitates communication between a wireless communication terminal and a resource-constrained device, in an embodiment. The flowchart is described with respect to the devices of FIG. 1 merely for illustration. However, various features described herein can be implemented in other environments and using other components as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, link device 120 receives, from wireless communication terminal 110, a first message on a wireless medium. The first message is generated by an application executing in wireless communication terminal 110, and is designed according to a first protocol. Alternatively, the first message may be generated in cloud 180 and forwarded to wireless communication terminal 110 for wireless transmission to link device 120. Control then passes to step 220.

In step 220, link device 120 translates the first message into a second message. The second message is designed according to a second protocol. The second protocol is a protocol that is 'understood' by resource-constrained device 130, i.e., resource-constrained device 130 is designed to be capable of interpreting and acting based on information encoded according to the protocol employed in the second message. Control then passes to step 230.

In step 230, link device 120 transmits the second message to resource-constrained device 130 on a wired path. Control then passes to step 299, in which the flowchart ends.

While the flowchart relates to communication in one direction (i.e., towards resource-constrained device 130), it should be appreciated that link device 120 similarly facilitates communication in the reverse direction as well, performing a translation from the second protocol to the first protocol in this case. The first message noted above may be destined to (as against merely for forwarding by) link device 120, and thus includes a destination address of link device 120.

Such two way communication enables link device 120 to facilitate complete connected end-to-end solutions to be deployed between wireless communication terminal 110 and resource-constrained device 130 based on Internet protocols (TCP/IP, UDP, HTTP, etc) and standard data encoding methods (e.g., XML). In particular, link device 120 enables mobile applications executing on wireless communication terminal 110 to interact with resource-constrained device 130 using protocols such as HTTP, TCP/IP, CoAP (Constrained Application Protocol), and UDP. In an alternative embodiment, the communication between wireless communication terminal 110 and link device 120 is performed using a custom/proprietary protocol over TCP/UDP. In yet another alternative embodiment, the communication between wireless communication terminal 110 and link device 120 is performed using custom extensions over 802.11 control frames such as beacons, probe requests, etc. In such alternative embodiments, the resource and operation is specified by custom data encoding/extension. In effect, link device 130 'hides' from resource-constrained device 130, the complexities of the 'high-level' protocols such as, for example, internet protocols and 'high-level' data encoding methods such as, for example, XML, by translating such protocols into the second protocol noted above in the flowchart.

Thus, for example, the operation of link device 120 in translating between the first and second protocols allows mobile and web applications to built on top of HTTP using REST style APIs, even though resource-constrained device 130 may be constrained in terms of resources required to support such protocols. REST style APIs are described in detail in the document titled "Architectural Styles and the Design of Network-based Software Architectures", Doctoral dissertation, University of California, Irvine, 2000 by Roy Thomas Fielding.

In addition, link device 120 may also be implemented to enable resource-constrained device 130 to advertize HTTP resources via mDNS/DNS-SD and have them discovered automatically by compatible clients. mDNS/DNS-SD are specified by IETF drafts. "DNS-Based Service Discovery <draft-cheshire-dnsext-dns-sd-11.txt>" published on Dec. 9, 2011 by the Internet Engineering Task Force (IETF) and "Multicast DNS draft-cheshire-dnsext-multicastdns-15" published on Dec. 9, 2011 by the Internet Engineering Task Force (IETF). mDNS allows for automatic addressing and naming of hosts on a local subnet (e.g., 795 of FIG. 7, described below) without the requirement for a DNS server. Similarly, DNS-SD allows for discovery of services on the local subnet (such as 795 of FIG. 7, described below).

The description is continued with illustrations of example transactions that can occur between wireless communication terminal 100 and resource-constrained device 130, with link device 120 mediating the transactions according to the steps of the flowchart described above.

4. Example Transactions

Figure 3:
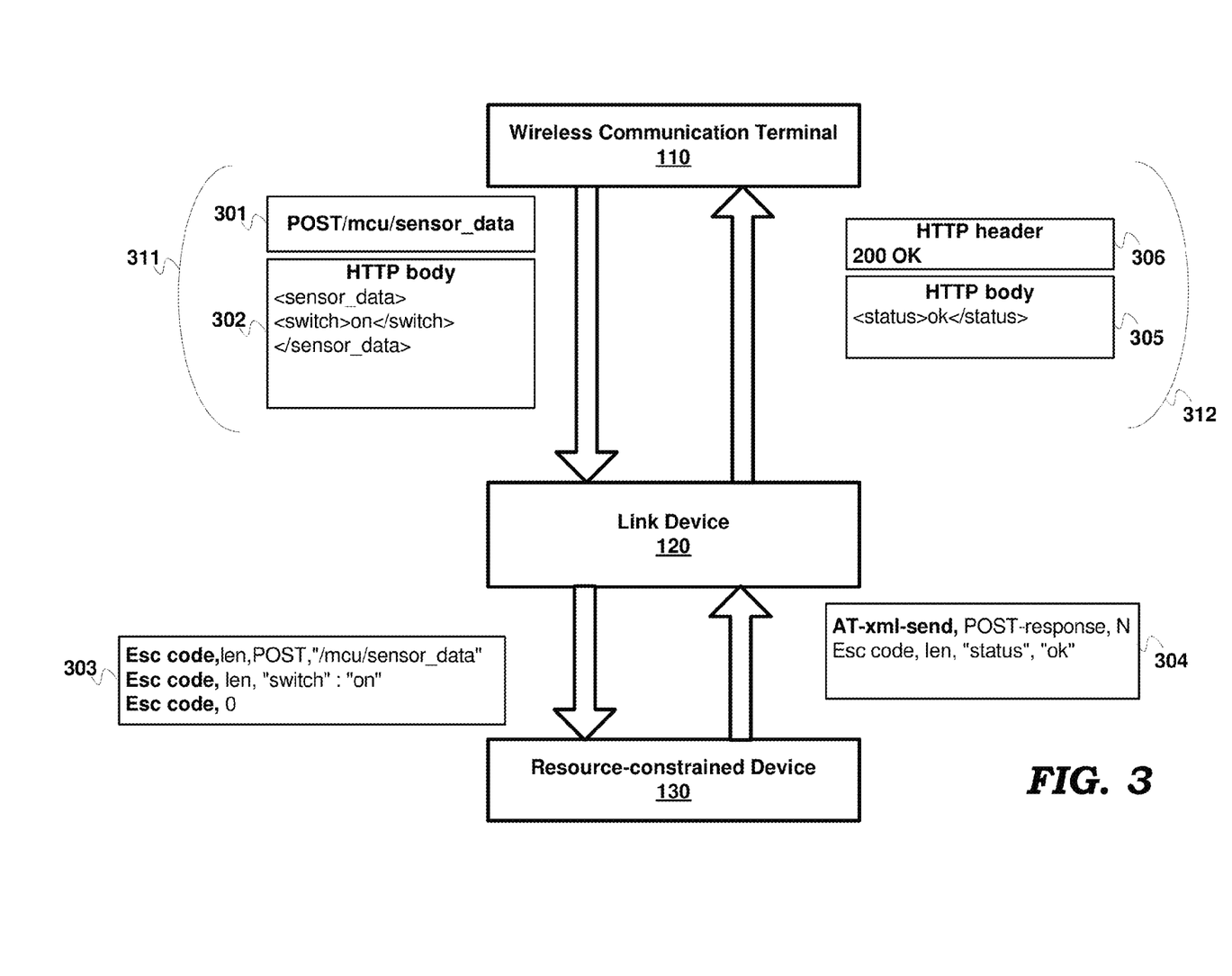
FIG. 3 is a block diagram illustrating the manner in which a link device facilitates an example transaction.

FIG. 3 is a diagram illustrating the manner in which link device 120 facilitates an example transaction. The communication between wireless communication terminal 110 and link device 120 is shown as being based on HTTP, which is described in further detail in RFC 2616 entitled, "Hypertext Transfer Protocol—HTTP/1.1" by R. Fielding et al.

In the example transaction, wireless communication terminal 110 is shown sending HTTP request 311 containing HTTP header 301 and HTTP body 302. HTTP request 311 is encapsulated in a TCP/IP packet directed to (i.e., having destination IP address set equal to the IP address of) link device 120.

HTTP request line 301 indicates that the requested operation (method in RFC parlance) is a POST on a resource identified by a URI (Uniform Resource Identifier) of mcu/sensor_data. According to a convention, a tag matching the last portion of the URI (here 'sensor_data') is included in the HTTP body to further define various information required for the performance of the requested operation.

Thus HTTP body 302 contains tag <sensor_data>, indicating that a sensor identified by URI mcu/sensor_data is to be turned on.

It may be appreciated that the above example illustrates a simple case where there is only a single sensor with resource-constrained device 130. However, assuming that multiple sensors are present in resource-constrained device 130, the XML data in HTTP body 302 would identify the specific sensor on which an operation is to be performed.

Furthermore, link device 120 can be connected to multiple resource-constrained devices (though only a single one is shown in the Figures), and accordingly the URI can potentially indicate the specific device and/or resource within such specific device.

Link device 120 parses the HTTP/XML message 311 and translates the message to another (second) format, which resource-constrained device 130 is designed to 'understand'. The corresponding message along with the message entries is shown as 303. "Message entries" refers to each unit in the message that lends meaning to the message. For example, in message 303, each of message units Esc code, len, and "switch": "on" is a message entry.

Thus, resource-constrained device 130 parses message 303, executes the operation POST on the specified URI (/MCU/sensor_data) causing the sensor to switch on. In message 303, "ESC code" represents a specific character (escape code) to designate start of a line in the message, and "len" indicates the number of characters in a line. The line "Esc code, 0" indicates end of the message.

Resource-constrained device 130 then forwards message 304 containing information on status of execution of the requested operation. Message 304 is also in the second format, which is then converted into XML format and encapsulated as part of the HTTP response by link device 120, before forwarding the converted message 312 (containing header 306 and body 305). In message 304, N indicates the number of response elements, which in message 304 equals 1, corresponding to the only one response element, namely ("status" with a value of "ok").

Figure 4:
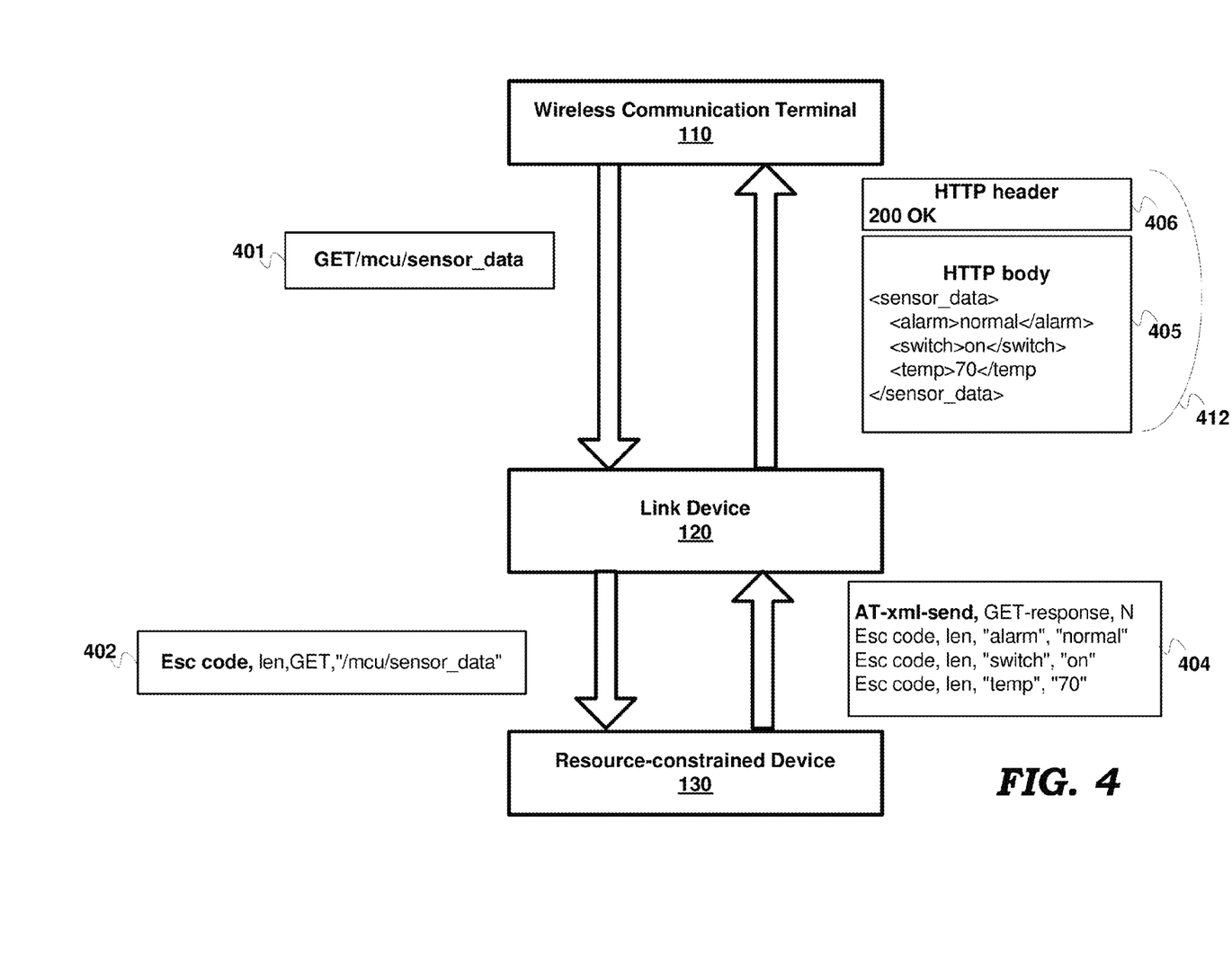
FIG. 4 is a block diagram illustrating the manner in which a link device facilitates another example transaction.

FIG. 4 depicts another example transaction in which wireless communication terminal 110 seeks to get information from a sensor specified by the URI shown in the request line of the GET request. HTTP header 401 depicts the invocation of the GET operation and the corresponding URI. Link device 120 performs the necessary translation to form message 402. Since this is a GET operation, the request is self contained in the request line itself (there are no additional message entries), and hence no requirement for an end-of-message indication using an "Esc code, 0" line in message 402.

Resource-constrained device 130 then parses message 402 and performs the operation specified by the message. The requested information is then encoded as message 404, which is sent to link device 120. In message 404, N indicates the number of response elements, which in message 304 equals 3. Link device 120 translates the message into XML format, encapsulates the message as part of the HTTP response and sends the resulting message 412 to wireless communication terminal 110.

The transactions described above are provided merely by way of illustration. It may be appreciated that in more complex transactions (involving multiple resources in resource-constrained device 130), the HTTP requests from wireless communication terminal 110 would be more complex (require higher processing power for parsing/decoding). Link device 120 provides the translation to convert the XML data to a format that can be decoded using lesser processing power and code program size in resource-constrained device 130. The translation generates a message according to a protocol (the second protocol noted above) that provides for more deterministic parsing as lengths of message fragments are available and fields clearly separated using a separator. For example, it may be observed from message 303 that the second field (len) indicates the length in terms of number of characters in that line. It may also be observed that the characters are separated by a comma, which serves to act as a delimiter/separator between characters. The entry "ESC code, 0" specifies end of message. Thus, it is easier for resource-constrained device 130 to parse message 303 as compared to parsing message 311.

As a result, the resource-constrained devices can be implemented with reduced memory and processing requirements, required in the corresponding embedded devices type environments. Link device 120 therefore enables applications in wireless communication terminal 110 to use Internet protocols (TCP/IP, UDP, HTTP, etc) and more complex data encoding approaches (XML) to communicate with resource-constrained device 130. An additional advantage provided by the approach of above is that the second protocol can be made available (for example, in the form of APIs or application programmers' interface) to manufacturers of resource-constrained devices such as resource-constrained device 130. As a result, different types (e.g., printer, RFID tag, sensor, etc) of resource-constrained devices from different manufactures can be built to conform to (i.e., be able to parse and act on) the second protocol, thereby requiring link device 120 to be implemented with the ability to translate only between the first protocol and the second protocol (rather than having to be capable of translating between the first protocol and multiple vendor-specific protocols corresponding to the disparate set of resource-constrained devices).

Figure 5:
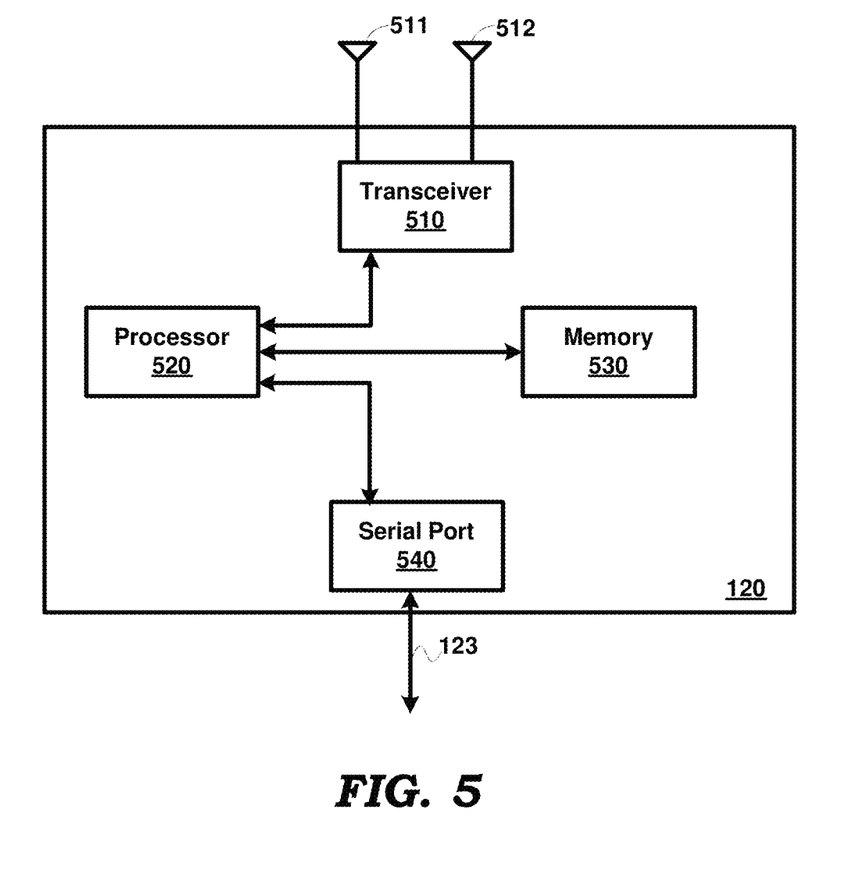
FIG. 5 is a block diagram of the internal details of a link device in an embodiment of the present invention.

The internal details of link device 120 are illustrated next with respect to an example embodiment.

5. Link Device

FIG. 5 is a block diagram of the internal details of a link device in an embodiment of the present invention. Link device 120 is shown containing transceiver 510, processor 520, memory 530, serial port 540 and antennas 511 and 512. The specific details of link device 120 are illustrated merely by way of example, and real-world implementations may have many more internal blocks/components. The wireless interface provided by the combination of transceiver 510 and antennas 511 and 512 represents the wireless link 121 of FIG. 1.

Transceiver 510 contains a transmitter portion and a receiver portion. The transmitter portion receives data to be transmitted on a wireless medium from processor 520, modulates a carrier with the data according to corresponding modulation techniques, and transmits a modulated carrier signal on the wireless medium via antenna 511. The organization of data that is transmitted may be according to well-known protocols and/or standards. The receiver portion of transceiver 520 receives via antenna 512 a signal from the wireless medium, demodulates the data carried by the signal, and forwards the data to processor 520. In an embodiment, transceiver 510 is designed to operate according to IEEE 802.11 standards and protocols. Accordingly, link device 120 may be designed to operate either as an access point (AP) or a wireless station, as described below with respect to FIG. 7. However, in other embodiments, transceiver 510 may be designed to operate according to other technologies such as Bluetooth™, GSM, CDMA, etc.

Memory 530 stores instructions for execution by processor 520 for providing the features described above. In particular, the instructions enable link device 120 to perform protocol translations for messages communicated between wireless communication terminal 110 and resource-constrained device 130. Memory 530 may also store data required for execution of the instructions. Memory 530 is implemented as a non-volatile memory, and may additionally include volatile memory such as RAM (random access memory). Memory 530 constitutes a computer program product or a machine/computer readable medium, which is a means for providing instructions to processor 520. Processor 520 may contain multiple processing units internally, with each processing unit potentially being designed for a specific task. Alternatively, processor 520 may contain only a single general-purpose processing unit.

Serial port 540 represents a serial communications interface for communication on wired path 123. Serial port 540 may include a serial port controller (e.g., UART) and corresponding line drivers for level translation (based on the digital data) according to RS-232. RS-232 represents an example serial port, however alternative embodiments can be implemented using other type of serial ports, parallel ports, etc., without departing from the scope and spirit of several aspects of the present invention.

Figure 6:
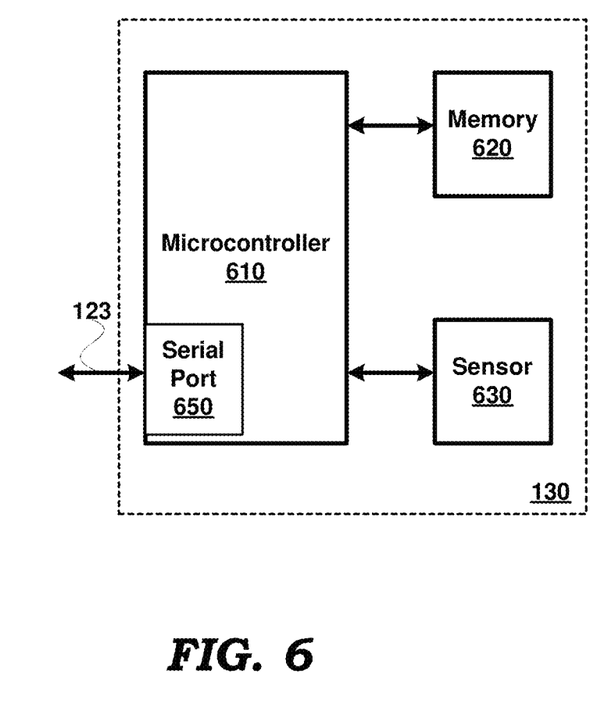
FIG. 6 is a block diagram of the internal details of a resource-constrained device in an embodiment of the present invention.

FIG. 6 is a diagram illustrating the details of resource-constrained device 130 in an embodiment, and is shown containing microcontroller 610, memory 620 and sensor 630. Sensor 630 may be a transducer used for measuring physical parameters such as temperature, pressure, humidity, etc., and provides the corresponding measurement in digital form to microcontroller 610. Sensor 630 can be the object of the commands described above with respect to FIGS. 3 and 4. Memory 620 stores instructions and data, which enable resource-constrained device 130 to provide several features of the present invention.

Microcontroller 610 is shown containing serial port 650 (e.g., UART) and corresponding line drivers for level translation according to RS-232. Microcontroller 610 may have only 'moderate' to 'low' computing power, compared to, for example, processor 520 of link device 120 or a processor used in wireless communication terminal 110. An example implementation of microcontroller 610 may be an 8-bit microcontroller operating at comparatively low clock frequencies.

Micro-controller 610 may receive and execute the instructions stored in memory 620 to receive and transmit data via serial port 650. The received data (in a message) may be stored in (as corresponding digital data) memory 620 before examination/parsing by micro-controller 610. Based on such examination, micro-controller 610 may issue commands to sensor 630, form status data (based on result of issuing the commands) and send the status data in the form of corresponding messages to link device 120. The specific commands to issue are determined based on the message content.

The features described above can be deployed in several environments. The description is continued with respect to an example environment, which uses such features.

6. Example Environment

Figure 7:
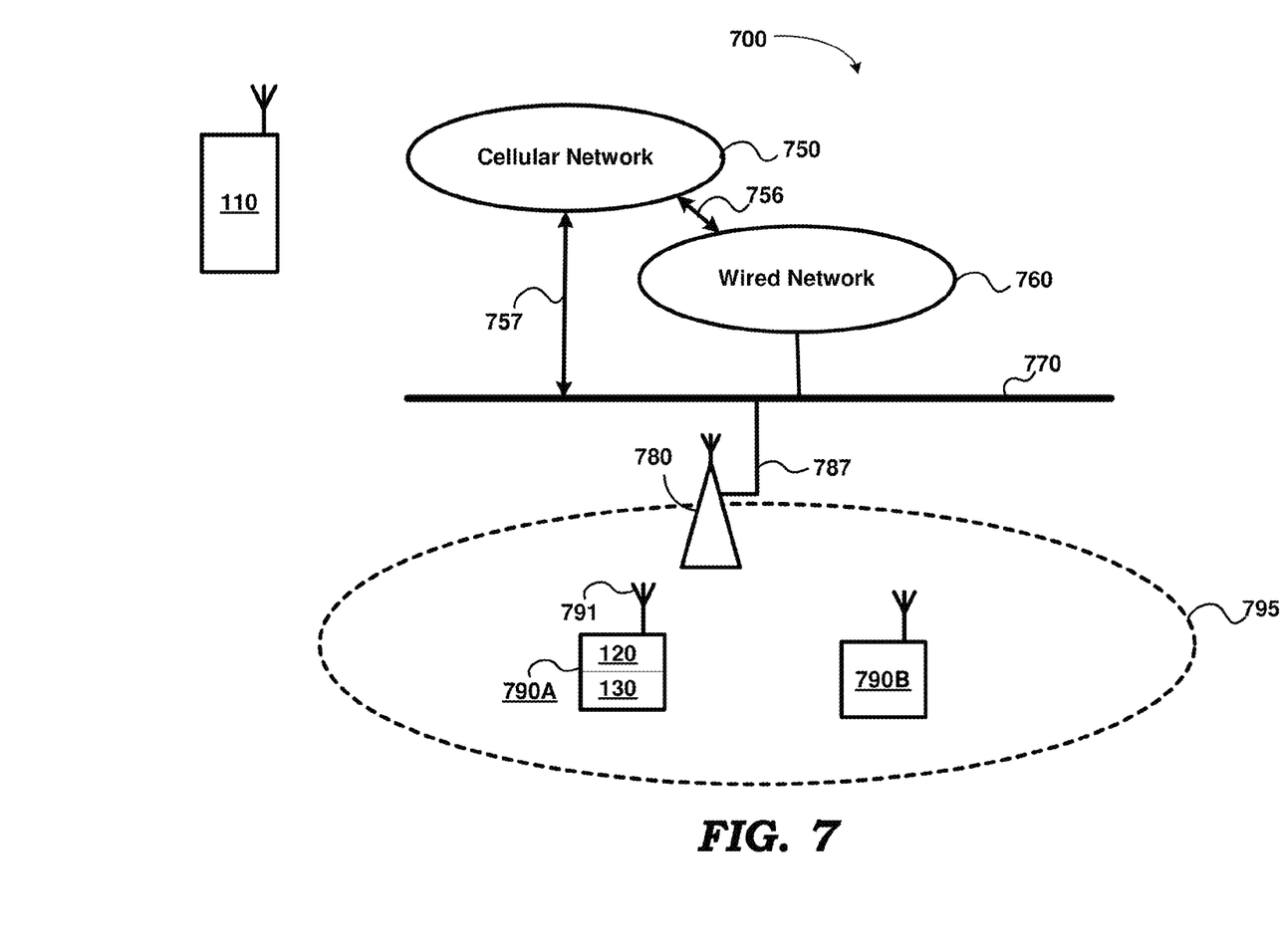
FIG. 7 is a block diagram of another example environment in which several features of the present invention can be implemented.

FIG. 7 is a block diagram illustrating an example environment in which several features of the present invention can be implemented. The example environment is shown containing only representative systems for illustration. However, real-world environments may contain many more systems/components as will be apparent to one skilled in the relevant arts. Further, in the description below, the components and the environment are described as operating consistent with IEEE 802.11 standard(s), merely for illustration. Implementations in other environments are also contemplated to be within the scope and spirit of various aspects of the present disclosure.

System 700 is shown containing wireless stations (also known as clients) 790A and 790B, access point (AP) 780, wired network 760, wired network backbone 770, cellular network 750 and wireless communication terminal 110. Block 795 represents a basic service set (BSS) consistent with the 802.11 standard(s). Other environments may include more than one BSS, with the BSSs being interconnected to form an extended service set (ESS) consistent with IEEE 802.11 standards. While the description below is provide with respect to an infrastructure BSS, several embodiments of the present disclosure can be implemented in an independent BSS (IBSS) as well. As is well-known in the relevant arts, an IBSS is an ad-hoc network and does not contain access points.

AP 780 is connected by a wired medium (787) to wired network backbone 770 and thus to wired network 760. Each of clients 790A and 790B may communicate with AP 780 (as well as with each other) wirelessly according to any of the family of IEEE 802.11 protocols (including as specified in IEEE 802.11a, 802.11b, 802.11g and 802.11n) and thereby with wired network 760 and devices (such as wireless communication terminal 110) serviced by cellular network 750. Wired network 760 may represent the internet, also known as the World Wide Web. Cellular network 750 provides cell-based communications to corresponding devices according to cellular standards such as GSM and CDMA. Cellular network 750 provides communication connectivity between wireless communication terminal 110 (and other devices, such as mobile phones (not shown), serviced by cellular network 750) and devices in BSS 795 (including clients 790A and 790B) as well as those in wired network 769. Cellular network 750 is shown connected by wired paths 757 and 756 respectively to backbone 770 and wired network 760.

Client 790A represents the combination of link device 120 and resource-constrained device 130, with a wired serial path connecting link device 120 and resource-constrained device 130. Antenna 791 represents the combination of antennas 511 and 512 of FIG. 5. Client 790A may interact with wireless communication terminal 110 as described above.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A system comprising:
a resource-constrained device;
a wireless communication terminal; and
a link device communicatively coupled to said resource-constrained device by a wired path and to said wireless communication terminal by a wireless path,
said link device to receive a first message over a first protocol which provides for specifying a resource and an operation to be performed on said resource in the form of text, wherein said first message contains a first text according to said first protocol specifying a first operation on a first resource of said resource-constrained device,
said link device forming a second message by translating the content of said first message into a second protocol, said second message containing a second text according to said second protocol to specify said first resource and said first operation, wherein said translating comprises parsing said first text of said first message in forming said second text of said second message,
said link device to send said second message according to said second protocol to said resource-constrained device on said wired path,
wherein said resource constrained device parses said second text to identify said first operation and said first resource, and in response to said identifying of said first operation and said first resource, executes said first operation with respect to said first resource,
wherein said second message formed by said link device and sent on said wired path does not contain headers corresponding to internet protocols such that said resource constrained device does not implement parsing corresponding to said internet protocols in processing of said second message,
wherein said second message is formed according to said second protocol irrespective of a manufacturer or vendor of said resource constrained device such that any manufacturer or vendor of said resource constrained device is required to process packets in accordance with second protocol only.

2. The system of claim 1, wherein said first protocol comprises HTTP (Hypertext Transfer Protocol), wherein said first message specifies said first operation in a request line of said first message according to HTTP (Hypertext Transfer Protocol), said request line further containing a Uniform Resource Identifier (URI) identifying a component in said resource-constrained device, which is an object of said first operation,
wherein said second protocol comprises a code to indicate a new line,
said second text comprising a plurality of lines and a first line of said plurality of lines representing said first operation, said first line being demarcated by said code.

3. The system of claim 2, wherein said first message further comprises a HTTP (Hypertext Transfer Protocol) body, wherein said HTTP (Hypertext Transfer Protocol) body is encoded with data in eXtensible Markup Language (XML) format in which at least some tags span multiple lines.

4. The system of claim 1, wherein said first message further comprises a CoAP (Constrained Application Protocol) body, wherein said CoAP (Constrained Application Protocol) body is encoded with data in JSON (JavaScript Object Notation).

5. The system of claim 3, wherein said component comprises a device, said operation being directed to said device, wherein said first message is destined for said link device.

6. The system of claim 5, wherein said device is uniquely identified by said URI (Uniform Resource Identifier).

7. The system of claim 5, wherein said resource-constrained device comprises a plurality of devices,
said URI (Uniform Resource Identifier) identifying that said first operation is to be performed with respect to one of said plurality of devices, and
said HTTP (Hypertext Transfer Protocol) body contains data in said XML (eXtensible Markup Language) format to identify said device.

8. The system of claim 3, wherein said first message is generated by a first application executing in said wireless communication terminal, wherein messages communicated between said first application and said resource-constrained device form the basis for the management of said resource-constrained device using said first application executing in said wireless communication terminal.

9. The system of claim 3, wherein said resource constrained device and said link device are provided as corresponding physical units connected by a serial link,
wherein said resource constrained device and said link device are together operable as a wireless station in a wireless local area network such that said wireless communication terminal communicates with said resource-constrained device based on said wireless local area network via said link device.

10. The system of claim 9, wherein said serial link is one of UART (Universal Asynchronous Receiver transmitter/RS-232 serial interface) and SPI (serial peripheral interface).

11. The system of claim 9, wherein said second protocol is further defined to specify a length of a line, to include said code as separators between successive lines of said second message such that the overhead for parsing of said second message is easier than parsing of said first message over HTTP (Hypertext Transfer Protocol).

12. The system of claim 9, wherein said first protocol comprises CoAP (Constrained Application Protocol) over UDP (User Datagram Protocol), wherein said first message specifies said first operation in a request line of said first message according to CoAP (Constrained Application Protocol), said request line further containing a Uniform Resource Identifier (URI) identifying a component in said resource-constrained device, which is an object of said first operation.

13. The system of claim 9, wherein said first protocol comprises a custom protocol over TCP/UDP (Transmission Control Protocol/User Datagram Protocol), wherein said first message specifies said first operation in a request line of said first message according to said custom protocol, said request line further containing a Uniform Resource Identifier (URI) identifying a component in said resource-constrained device, which is an object of said first operation.

14. The system of claim 9, wherein said first protocol comprises a custom protocol designed using custom extensions over 802.11 control frames, wherein said first message specifies said first operation in a request line of said first message according to said custom protocol, said request line further containing a Uniform Resource Identifier (URI) identifying a component in said resource-constrained device, which is an object of said first operation.

15. The system of claim 9, wherein said first protocol comprises CoAP (Constrained Application Protocol), wherein said first message specifies said first operation in a request line of said first message according to CoAP (Constrained Application Protocol), said request line further containing a Uniform Resource Identifier (URI) identifying a component in said resource-constrained device, which is an object of said first operation.

16. The system of claim 15, wherein said first message further comprises a CoAP (Constrained Application Protocol) body, wherein said CoAP (Constrained Application Protocol) body is encoded with data in XML (eXtensible Markup Language) format.

17. The system of claim 2, wherein said first message further comprises an HTTP (Hypertext Transfer Protocol) body, wherein said HTTP (Hypertext Transfer Protocol) body is encoded with data in JSON (JavaScript Object Notation).

18. A link device to facilitate communication between a resource-constrained device and a wireless communication terminal, said link device comprising:
a wireless transceiver to receive a first message according to a first protocol from said wireless communication terminal on a wireless medium;
a memory storing a set of instructions;
a processor to receive and execute said set of instructions to generate a second message according to a second protocol by translating the content of said first message; and
a wired communication interface to transmit said second message to said resource-constrained device on a wired path connecting said link device to said resource-constrained device,
wherein said first message contains a first text according to said first protocol, said first text specifying a resource, and an operation to be performed on said resource, said resource being contained in said resource-constrained device,
wherein said second message contains a second text according to said second protocol to also specify said resource and said first operation,
wherein said processor parses said first text of said first message in translating the content of said first message, and
wherein said resource-constrained device parses said second text to identify said operation and said resource, and in response executes said operation with respect to said resource,
wherein said second message formed by said link device and sent on said wired path does not contain headers corresponding to internet protocols such that said resource constrained device does not implement parsing corresponding to said internet protocols in processing of said second message,
wherein said second message is formed according to said second protocol irrespective of a manufacturer or vendor of said resource constrained device such that any manufacturer or vendor of said resource constrained device is required to process packets in accordance with second protocol only.

19. The link device of claim 18, wherein said first protocol is HTTP (Hypertext Transfer Protocol) protocol and a request line of said first message contains a Uniform Resource Identifier (URI) identifying said resource-constrained device, thereby causing said wired communication interface to transmit said second message to said resource-constrained device,
wherein said second protocol comprises a code to indicate a new line,
said second text comprising a plurality of lines, and a first line of said plurality of lines representing said first operation, said first line being demarcated by said code.

20. The link device of claim 19, wherein said first message further comprises a HTTP (Hypertext Transfer Protocol) body, wherein said HTTP (Hypertext Transfer Protocol) body is encoded with data in eXtensible Markup Language (XML) format in which at least some tags span multiple lines,
wherein said second protocol is further defined to specify a length of a line in said plurality of lines, and to include said code as separators between successive lines of said second message such that the overhead for parsing of said second message is easier than parsing of said first message over HTTP (Hypertext Transfer Protocol).

21. The link device of claim 20, wherein said first message specifies, in said request line, a first operation to be performed by a component in said resource-constrained device.

22. The link device of claim 21, wherein said component comprises a device, said operation being directed to said device, wherein said device is uniquely identified by said URI (Uniform Resource Identifier).

23. A method of facilitating communication between a first resource-constrained device and an application on a wireless communication terminal, said method being performed in a link device, said method comprising:
receiving, from said wireless communication terminal, a first message on a wireless medium, wherein said first message is generated by said application and designed according to a first protocol, said first message containing a first text specifying a first operation on a first resource of said first resource-constrained device;
translating said first message into a second message, wherein said second message is designed according to a second protocol, said second message containing a second text specifying said first resource and said first operation; and
transmitting said second message to said first resource-constrained device on a wired path connecting said link device to said first resource-constrained device, wherein said first resource constrained device parses said second text to identify said first operation and said first resource, and in response executes said first operation with respect to said first resource, wherein said second message formed by said translating and transmitted on said wired path does not contain headers corresponding to internet protocols such that said resource constrained device does not implement parsing corresponding to said internet protocols in processing of said second message, wherein said second message is formed according to said second protocol irrespective of a manufacturer or vendor of said resource constrained device such that any manufacturer or vendor of said resource constrained device is required to process packets in accordance with second protocol only.

24. The method of claim 23, wherein said first protocol is Hypertext Transfer Protocol (HTTP), wherein said translating comprises parsing digital representation of the content of said first message.

25. The method of claim 24, wherein said first message specifies said first operation in a request line of said first message, said request line further containing a Uniform Resource Identifier (URI) identifying a component in said first resource-constrained device, which is an object of said first operation, wherein said second protocol comprises a code to indicate a new line, said second text comprising a plurality of lines, and a first line of said plurality of lines representing said first operation, said first line being demarcated by said code.

26. The method of claim 25, wherein said first message further comprises a HTTP (Hypertext Transfer Protocol) body, wherein said HTTP (Hypertext Transfer Protocol) body is encoded with data in eXtensible Markup Language (XML) format in which at least some tags span multiple lines, wherein said second protocol is further defined to specify a length of a line in said plurality of lines, and to include said code as separators between successive lines of said second message such that the overhead for parsing of said second message is easier than parsing of said first message over HTTP (Hypertext Transfer Protocol).

27. The method of claim 26, wherein said component comprises a device, said operation being directed to said device.

* * * * *